United States Patent

[11] 3,586,836

| [72] | Inventor | John J. Paul |
| | | Montreal, Quebec, Canada |
| [21] | Appl. No. | 768,486 |
| [22] | Filed | Oct. 17, 1968 |
| [45] | Patented | June 22, 1971 |
| [73] | Assignee | Sperry Rand Canada Limited |
| | | Toronto, Ontario, Canada |
| [32] | Priority | Aug. 29, 1968 |
| [33] | | Canada |
| [31] | | 28,841 |

[54] TIME-SHARED BIDIRECTIONAL PULSE COUNTER
8 Claims, 5 Drawing Figs.

[52] U.S. Cl.................................................. 235/92,
307/222, 328/44
[51] Int. Cl.................................................. G06g 7/00,
H03k 21/00, H03k 23/08
[50] Field of Search........................................ 235/92;
328/44, 48; 340/149 A; 307/222

[56] References Cited
UNITED STATES PATENTS
3,056,116 9/1962 Crane....................340/149 A (UX)
3,319,054 5/1967 Kelling........................ 235/92 (.28)

OTHER REFERENCES
Taylor, " Pulse Generators and Counters Check Paper Mill Speed," CONTROL ENGINEERING, Vol. 9, No. 3, Mar. 1962, p. 117.

Primary Examiner—Maynard R. Wilbur
Assistant Examiner—Thomas J. Sloyan
Attorney—S. C. Yeaton ABSTRACT: Apparatus for counting the number of pulses in recurring groups of pulses and for accumulating positive and negative increments in the number of pulses in each group in excess of a predetermined amount. The pulse groups are applied to an UP (forward) counter which overflows into a preset DOWN (backward) counter to provide a signal for incrementing a bidirectional counter. The number appearing in the bidirectional counter after a preceding pulse group is preset into the DOWN counter between groups. The number remaining in the DOWN counter after the next succeeding pulse group determines the sense and magnitude of the increment to be applied to the bidirectional counter. A second bidirectional counter cascaded to the first bidirectional counter provides any desired numerical capacity.

TIME-SHARED BIDIRECTIONAL PULSE COUNTER

BACKGROUND OF THE INVENTION

The invention generally relates to digital apparatus for counting the number of pulses in recurring groups of input pulses and for bidirectionally accumulating counts in excess of the maximum number of pulses allowed in each group. The bidirectional feature allows the counter to follow increases and decreases in the number of pulses from one group to the next group provided that each increment or decrement does not exceed a predetermined amount. Thus, the invention is suitable for applications in which the pulses to be counted represent a recurrently sampled variable parameter having a predetermined maximum rate of change. Such a situation exists, for example, in the machine tool control art where it is necessary to measure the coordinates of a moving machine tool table and to represent the coordinate by means of digital signals. The principal object of the present invention is to provide means for portraying one or more coordinates of a moving machine tool table in terms of respective digital representations in the most economical manner. Full use is made of time-sharing techniques for minimizing apparatus.

SUMMARY OF THE INVENTION

A single coordinate axis of the present invention comprises an UP counter, a DOWN counter, and an UP/DOWN (bidirectional) counter. A recurring group of pulses representing the magnitude of a respective coordinate to be measured is applied to the UP counter. The numerical capacity of the UP counter is less than the maximum number of pulses allowed in each pulse group. Overflows from the UP counter are applied to the DOWN counter which proceeds to count in a downward or backward direction from the number preset therein. The preset number is derived from the UP/DOWN counter during the time between input pulse groups. The residual number in the DOWN counter following a given group represents the magnitude and the sense of the numerical disagreement between the number of pulses in said group and the number of pulses in the immediately preceding group. The magnitude and sense of the residual number is detected and applied to the UP/DOWN counter to update the number therein whereby the number stored in the UP/DOWN counter is made equal to the number of pulses applied to the DOWN counter in the respective sample period.

For the sake of component economy, the disclosed embodiment of the invention provides for updating the UP/DOWN counter at a maximum rate of unity per pulse group, i.e., the number of pulses applied to the DOWN counter from any two successive groups cannot differ by more than one. This in turn means that the maximum rate of change of the coordinate being measured cannot exceed that which produces in the DOWN counter a change of more than one pulse between any two successive pulse groups.

The UP counter is reset to zero and the DOWN counter is preset to the number in the UP/DOWN counter between successive pulse groups. The UP counter always displays the true value of lower significant digits of the number representing the coordinate being measured while the UP/DOWN counter by a process of comparison and updating is brought to the true value of higher significant digits of the coordinate being measured. Additional stages of UP/DOWN counter are coupled to the output of the first UP/DOWN counter to provide any desired numerical capacity.

In accordance with the present invention, an input coordinate data sensor is employed having high accuracy over a relatively small range of coordinate values. As the coordinate values change, the UP counter and the first UP/DOWN counter follow the absolute values of the data from the sensor. Each time that the sensor travels through the limit of its unambiguous range, an overflow is produced from the first UP/DOWN counter and is accumulated in the additional UP/DOWN counter to resolve the ambiguity inherent in the data from the high accuracy but limited range sensor.

DESCRIPTION OF THE PREFERRED EMBODIMENT

Figure 1A:
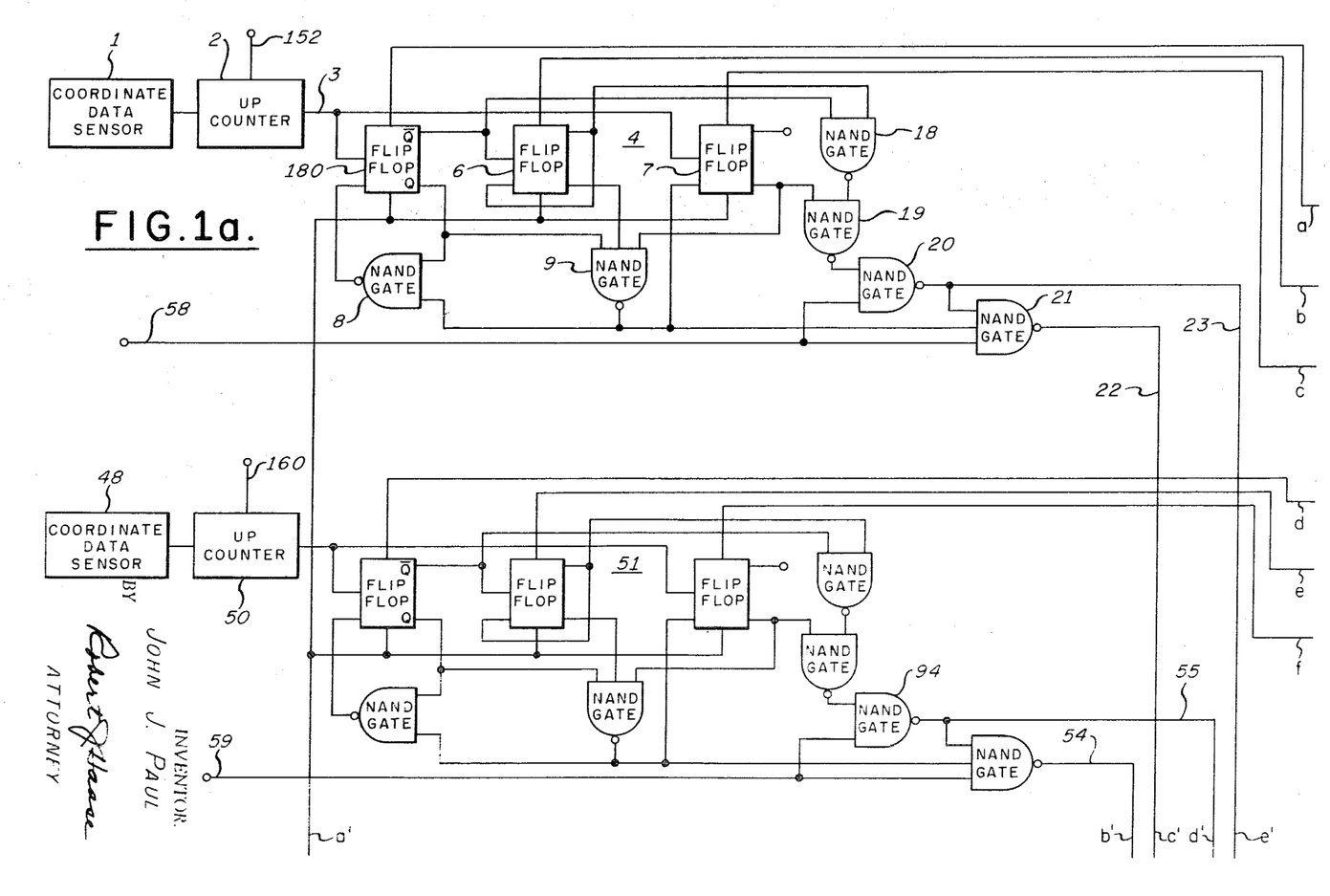
FIGS. 1a, 1b, 1c and 1d together comprise a simplified block diagram of the UP counters, DOWN counters and time-shared UP/DOWN counter of a three-axis embodiment of the present invention.

Referring to FIG. 1a, a conventional coordinate data sensor 1 provides recurrent groups of pulses, the number of pulses in each group representing the magnitude of the coordinate being measured. For high accuracy purposes, the sensor has a limited unambiguous range. As said sensor is driven (for example, by a machine tool table) in an increasing direction, the number of pulses in each group increases until the limit of the unambiguous range is reached, As the sensor is driven to and beyond said limit, the number of pulses in each group abruptly returns to zero and then increases again in a cyclically repetitive manner. The purpose of the counter of the present invention is to represent the number of pulses in each pulse group provided by sensor 1 by the lower order digits of a digital signal and to represent the number of times the sensor has cyclically exceeded its unambiguous range by the higher order digits of the same digital signal.

The lower order digits are provided in part by an UP counter 2 whose overflows are applied via line 3 to the input of DOWN counter 4. DOWN counter 4 comprises flip-flop stages 180, 6 and 7 and NAND gates 8 and 9 arranged to constitute a conventional divide-by-five counter. Coordinate data sensor 1 provides a group of output pulses at repetitive times. UP counter 2 is reset to zero between successive group times. The stages of DOWN counter 4, however, are preset between group times to the conditions of the respective stages of UP/DOWN counter 5 of FIG. 1b comprising flip-flops 10, 11 and 12. The remainder of the aforementioned lower order digits representing the umber of pulses in each group is provided by UP/DOWN counter 5. NAND gates 13, 14 and 15 interconnect respective pairs of the flip-flops comprising UP/DOWN counter 5 and those comprising DOWN counter 4. More particularly, NAND gate 13 interconnects flip-flops 10 and 180, NAND gate !14 interconnects flip-flops 11 and 6 and NAND gate 15 interconnects flip-flops 12 and 7. NAND gates 13, 14 and 15 are energized between group times by a clock signal applied to lead 16 of FIG. 1b whereby the digit values stored in flip-flops 10, 11 and 12 are shifted into flip-flops 180, 6 and 7.

In the typical situation, where sensor 1 of FIG. 1a is driven by a machine tool table from an initial reference position, the number of pulses in each recurrent group increases and the value of the count in UP counter 2 increases until its numerical capacity is exceeded and an overflow pulse is applied to DOWN counter 4. DOWN counter 4 proceeds to count in a negative direction in response to each overflow signal from UP counter 2 during a given group time. The residual count in DOWN counter 4 at the end of a given group time generally represents the difference between the counts stored in flip-flops 10, 11 and 12 of UP/DOWN counter 5 at the start of the group time and the number of pulses applied to DOWN counter 4 during the same group time. A residual count of zero in the DOWN counter 4 indicates that the number in flip-flops 10, 11 and 12 at the start of the group time either was equal to the number of pulses applied to DOWN counter 4 during the group time or was equal to the number of pulses applied to DOWN counter 4 during the group time plus an integral mutiple of five. The latter eventuality exists because the DOWN counter in some applications may be driven beyond its capacity several times during a given pulse group. In any event, a zero residual count signifies that the number of pulses in the two succeeding pulse groups in question is the same. Analogously, a positive residual count in DOWN counter 4 indicates that the number of pulses in the preceding pulse group was greater than the number of pulses in the presently terminated pulse group while a negative residual count in DOWN counter 4 indicates that the number of pulses in the preceding pulse group was less than the number of pulses in the presently terminated pulse group. In the case of divide-by-five counter 4, a residual count of 1 or 2 is considered positive while a residual count of 3 or 4 is considered negative.

The residual number in DOWN counter 4 is sensed by NAND gates 18, 19, 20, 21 and 9 to provide on lead 22 a binary ZERO signal in the event of a positive residue and a binary ZERO signal on lead 23 in the event of a negative residue. The ZERO signal on lead 22 is inverted in NAND gate 24 of FIG. 1c to provide a signal on line 25 designated "-DOWN". The ZERO signal on lead 23 is inverted in NAND gate 26 of FIG. 1c to provide a signal on line 27 designated "UP". Inverters 28 and 29 of FIG. 1d invert the signals at the output of NAND gates 26 and 24 respectively to provide $\overline{UP}$ signal on line 30 and $\overline{DOWN}$ signal on line 31, respectively. The UP, $\overline{UP}$, DOWN, $\overline{DOWN}$ lines 27, 30, 25 and 31 are applied to NAND gates 32—41 of FIG. 1d which also receive signals representing the states of flip-flops 69, 70 and 71 of FIG. 1b in a manner to be described later. The outputs of NAND gates 32, 33 and 34 are coupled to NAND gate 42; the outputs of NAND gates 35, 36, 37 and 38 are coupled to NAND gate 43; and the outputs of NAND gates 39, 40 and 41 are coupled to NAND gate 44. As the result of receiving the aforesaid signals via NAND gates 32—41, NAND gates 42, 43 and 44 provide output signals for updating the values of the digits stored in flip-flops 10, 11 and 12 to represent a number equaling the number of pulses last applied to DOWN counter 4. The updating signals from gates 42, 43 and 44 are applied via lines 45, 46 and via line 109, NAND gates 78, 79 and line 112 to flip-flops 10, 11 and 12. Said signals are shifted into flip-flops 10, 11 and 12 upon the application of the next clock signal to line 17 of FIG. 1b.

As will be seen later, NAND gates 32—44, 78 and 79 are arranged to provide digital signals on lines 45, 46 and 112 which are either identical to the value of the contemporaneous digits in flip-flops 69, 70 and 71 or differ therefrom by unity either in a positive or negative sense. The updating proceeds at the maximum rate of unity per pulse group. This updating rate is sufficient provided that sensor 1 is driven at a commensurate maximum rate. This is precisely the situation in a machine tool application because the maximum speed of the machine tool table, for example, is predetermined so that even at the maximum permissible rate the number of pulses in two successive pulse groups never differs by more than necessary to produce a change (positive or negative) of one pulse in DOWN counter 4 of FIG. 1a.

Provision is made in the present invention for handling independent coordinate data derived from three axes simultaneously. Coordinate data sensors 48 of FIG. 1a and 49 of FIG. 1c provide respective data on the additional coordinates being measured in the same manner as sensor 1. Sensors 48 and 49 produce recurring groups of pulses which are synchronized with those from sensor 1 so that all three groups occur substantially simultaneously. Source 48 of FIG. 1a is coupled to UP counter 50 which overflows into DOWN counter 51 whereas source 49 of FIG. 1c is coupled to UP counter 52 which overflows into DOWN counter 53 in the same manner described in connection with UP counter 2 and DOWN counter 4 of the first coordinate axis. DOWN counter 51 provides signals on lines 54 and 55 analogous to the signals on lines 22 and 23 whereas DOWN counter 53 provides signals on lines 56 and 57 analogous to the signals on lines 22 and 23. Lines 22, 54 and 56 are connected to NAND gate 24 of FIG. 1c. Lines 23, 55 and 57 are connected to NAND gate 26 of FIG. 1c. Only one of the three lines connected to each of the gates 24 and 26 is energized at a particular sample time in accordance with the coordinate selection signals successively applied to lines 58 and 59 of FIG. 1a and 60 of FIG. 1c during respective times.

Figure 1B:
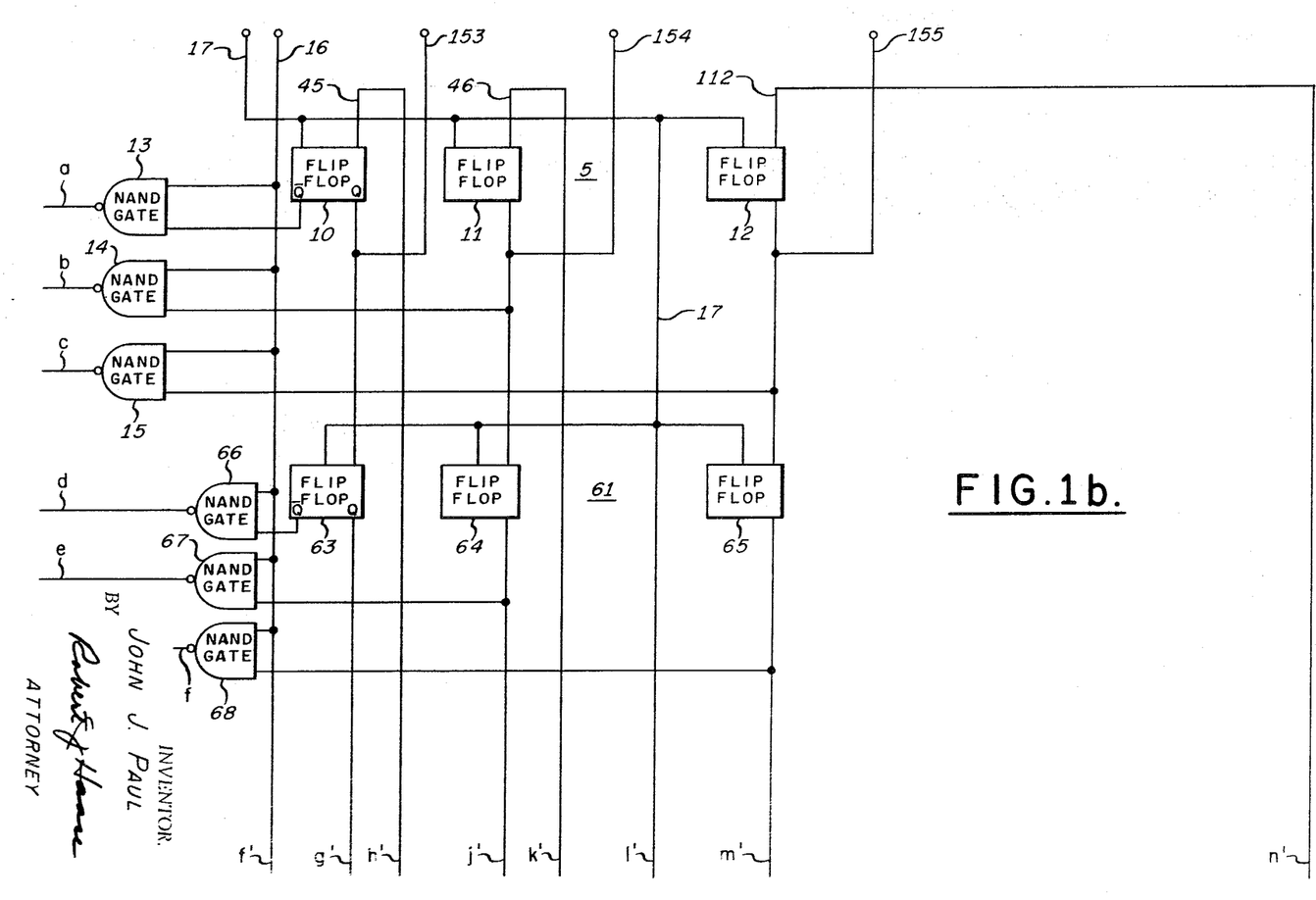
Figure 1C:
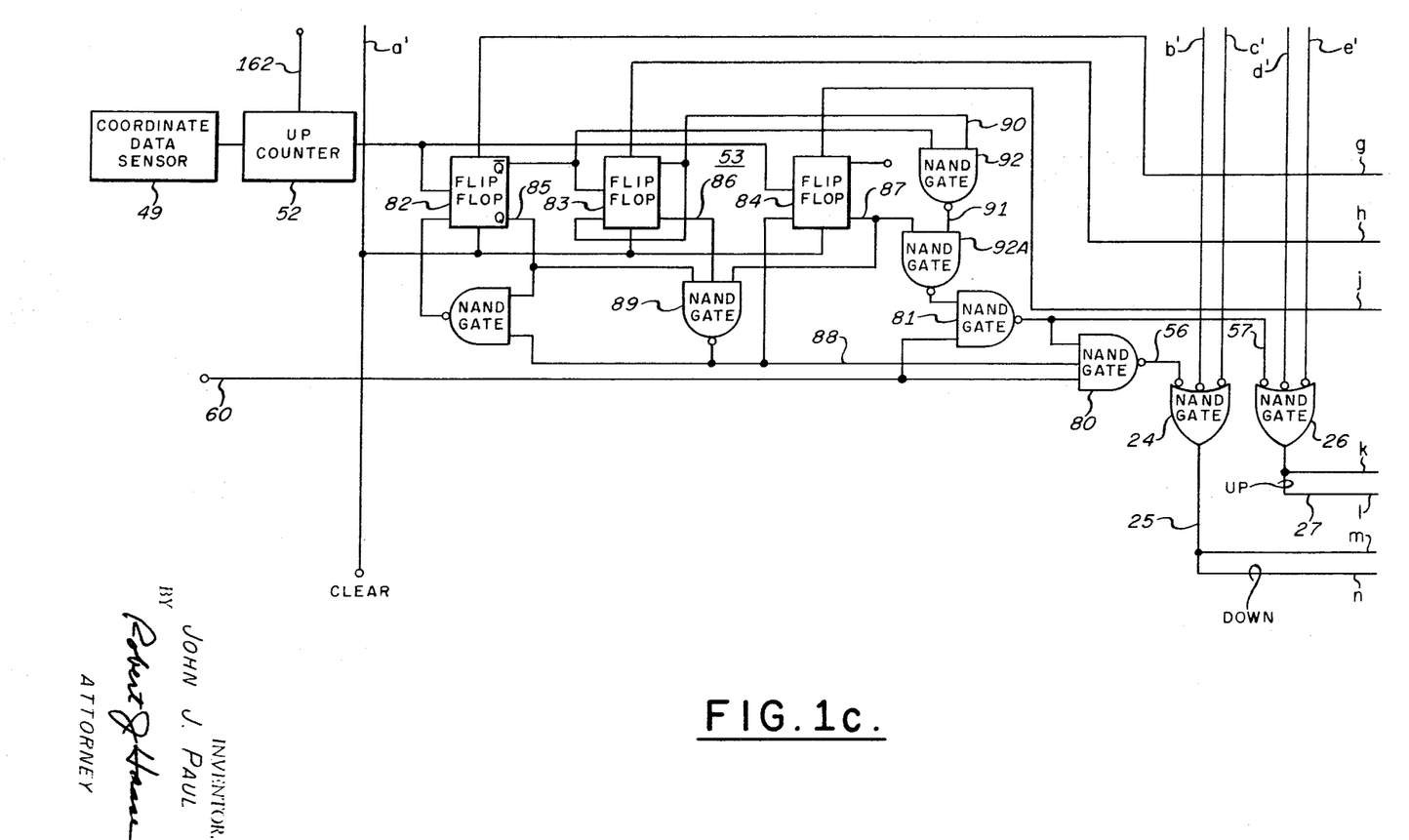
Figure 1D:
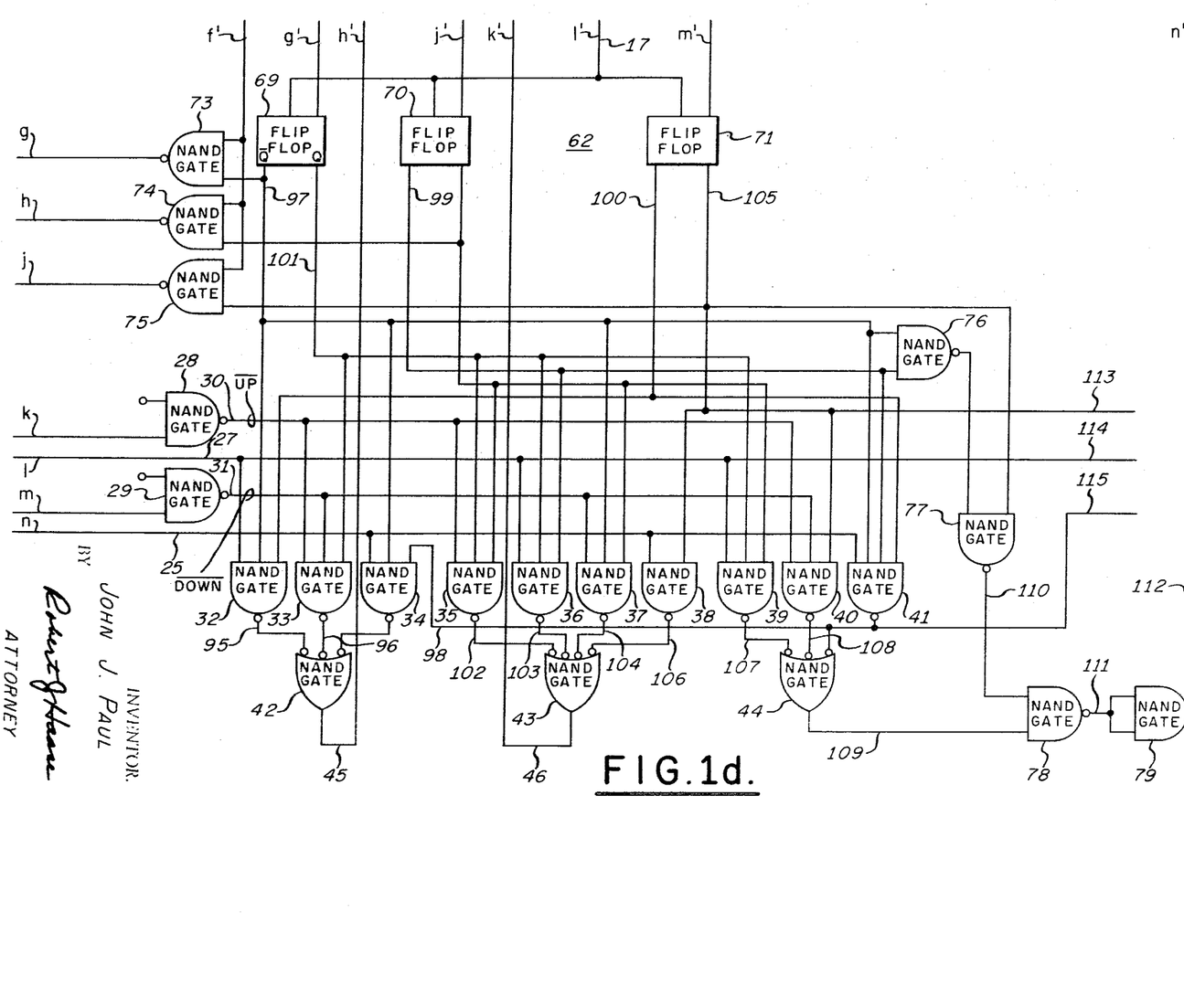

Further provision for the two additional coordinate axes are made by UP/DOWN counter 61 of FIG. 1b and UP/DOWN counter 62 of FIG. 1d. Flip-flops 63, 64 and 65 of UP/DOWN counter 61 are coupled via NAND gates 66, 67 and 68 to respective stages of DOWN counter 51 of FIG. 1a. Flip-flops 69, 70 and 71 of UP/DOWN counter 62 are coupled via NAND gates 73, 74 and 75 to respective flip-flops of DOWN counter 53 of FIG. 1c. The outputs of flip-flops 69, 70 and 71 are connected to NAND gates 32—41.

In the interest of economy of apparatus, the updating logic circuitry comprising NAND gates 32—44 and NAND gates 76, 77, 78 and 79 of FIG. 1d is time-shared between the UP/DOWN counters 5, 61 and 62 of the three coordinate axes. The numerical data stored in the three UP/DOWN counters is successively made available to the updating circuitry by circulating the data between the UP/DOWN counters in response to signals applied to lead 17. For example, assume that DOWN counters 4 and 51 of FIG. 1a and 53 of FIG. 1c are associated with X, Y and Z coordinate axis data, respectively. Let it be further assumed that UP/DOWN counters 5 and 61 of FIG. 1b and 62 of FIG. 1d initially store X, Y and Z coordinate data, respectively. Upon the application of a pulse signal to lead 16 of FIG. 1b, the X, Y and Z data from UP/DOWN counters 5, 61 and 62 are set into DOWN counters 4, 51 and 53. Then, the next group of pulses is supplied by the data sensors causing UP counter 52 and DOWN counter 53 of FIG. 1c to function as previously described.

Upon the application of a Z axis selection pulse to lead 60 of FIG. 1c, NAND gates 80 and 81 associated with DOWN counter 53 are activated to provide a ZERO signal on output line 56 or on output line 57 in the event that the residual count in DOWN counter 53 is positive (minimum) or negative (maximum), respectively. The relative binary weightings of the digits associated with flip-flops 82, 83 and 84 of DOWN counter 53 are 2, 4 and 8, respectively. In the disclosed embodiment, the flip-flops of DOWN counters 4, 51 and 53 are utilized so that a stored binary ONE produces a ONE signal on the output designated $\overline{Q}$. The flip-flops comprising UP/DOWN counters 5, 61 and 62, on the other hand, utilize conventional positive logic wherein a stored ONE produces a ONE signal on the output designated Q. Commercially available semiconductor networks such as type SN747N available from Texas Instruments Inc., are suitable for use as the flip-flops of both the DOWN counters and UP/DOWN counters.

A residual positive count in DOWN counter 53 of FIG. 1c would produce a ZERO on lead 85, a ONE on lead 86 and a ONE on lead 87 at the Q outputs of flip-flops 82, 83 and 84. Each of the NAND gates provides a ONE output in the event that any of its inputs is a ZERO and provides a ZERO output in the event that all its inputs are ONE. The ZERO signal on lead 90 from flip-flop 83 produces a ONE signal on lead 91 at the output of NAND gate 92. The ONE signal on lead 91 together with the ONE signal on lead 87 at the output of flip-flop 84 provides a ZERO signal at the output of NAND gate 92A, which, in turn, produces a ONE signal on lead 57 at the output of NAND gate 81. At the same time that the Z axis output of NAND gate 81 is applied to lead 60, deselection ZERO signals selection pulse is applied to lead 60, deselection ZERO signals are applied to X and Y axis leads 58 and 59 of FIG. 1a. The ZERO on lead 59 produces a ONE on lead 55 at the output of NAND gate 94. The ZERO on lead 58 produces a ONE on lead 23 at the output of NAND gate 20 whereby all three inputs 57, 55 and 23 of NAND gate 26 of FIG. 1c are ONE. The resulting ZERO on line 27 at the output of NAND gate 26 is inverted by gate 28 of FIG. 1d to a ONE on lead 30. Leads 27 and 30 are designated UP and $\overline{UP}$, respectively.

The ONE on lead 57 of FIG. 1c also is applied to one of the inputs to NAND gate 80. The second input to gate 80 (lead 60) is ONE. The third input on lead 88 likewise is ONE because the ZERO on lead 85 from flip-flop 82 is inverted into a ONE by NAND gate 89. The three ONES at the inputs to NAND gate 80 provide a ZERO on lead 56 which is inverted by NAND gate 24 to a ONE on lead 25. NAND gate 29 of FIG. 1d inverts the ONE into a ZERO on lead 31. Leads 25 and 31 are designated DOWN and $\overline{\text{DOWN}}$, RESPECTIVELY. In summary, the assumed states of 1 0 0 stored in flip-flops 82, 83 and 84 of FIG. 1c (positive residual count) provide signals on lines 30, 27, 31 and 25 of FIG. 1d representing $\overline{\text{UP}}$, UP, $\overline{\text{DOWN}}$ and DOWN of 1 0 0 and 1 respectively. These four signals together with the states of flip-flops 69, 70 and 71 of FIG. 1d provide the inputs to the logic circuitry comprising NAND gates 32—44 and NAND gates 76—79 to update the number stored in flip-flops 69, 70 and 71 in accordance with the commands on lines 30, 27, 31 and 25. Assuming, for example, that flip-flops 69, 70 and 71 are storing 0 0 and 0, respectively, the commands on lines 30, 27, 31 and 25 will cause the updating of the stored number 0 0 0 into the number 0 0 1 which is one less than the stored number 0 0 0. It should be noted that the five allowed numbers in each of the DOWN counters and in each of the UP/DOWN counters are 0 0 0, 1 0 0, 0 1 0, 1 1 0, and 0 0 1 in the order of increasing magnitude.

The updating of the stored number 0 0 0 into the number 0 0 1 is accomplished as follows. The 0 on lead 27 is inverted by gate 32 to a ONE on lead 95. The ZERO on lead 31 is inverted into a ONE on lead 96 by gate 33. One of the inputs to gate 34 is derived from line 98 at the output of gate 41. The ONE signal on lead 25 is applied to a first input to gate 41. The ONE signal on lead 97 at the $\overline{\text{Q}}$ output of flip-flop 69 is applied to the second input to gate 41. The ONE signal on lead 99 at the $\overline{\text{Q}}$ output of flip-flop 70 is applied to the third input of gate 41. The ONE signal on lead 100 at the $\overline{\text{Q}}$ output of flip-flop 71 is applied to the fourth input of gate 41 producing a ZERO on lead 98. The ZERO on lead 98 produces a ONE at the output of gate 34 whereby all three inputs to gate 42 are ONE producing a ZERO on output lead 45. The ZERO on lead 101 at the Q output of flip-flop 69 is inverted by gate 35 into a ONE on line 102. The ZERO on lead 27 is inverted by gate 36 into a ONE on lead 103. The ZERO on lead 31 is inverted by gate 37 into a ONE on lead 104. The ZERO on line 105 at the Q output of flip-flop 71 is inverted by gate 38 into a ONE on lead 106 making all inputs to gate 43 ONES. Gate 43 produces a ZERO on lead 46.

The ZERO on lead 27 is inverted by gate 39 into a ONE on lead 107. The ZERO on lead 31 is inverted by gate 40 into a ONE on lead 108. As previously mentioned, a ZERO is on lead 98, and thus on the third input to gate 44, producing a ONE on output lead 109. The ZERO on lead 105 from flip-flop 71 is inverted by gate 77 into a ONE on lead 110 making both inputs to gate 78 ONES and producing a ZERO on lead 111 which is inverted into a ONE on lead 112 by gate 79. Gates 79, 78, 77 and 76 are included to preclude false counts from being circulated through the UP/DOWN counter, i.e., any count other than the previously mentioned five allowed counts. The updated count of 0 0 1, being an allowed count, is permitted to be applied to leads 45, 46 and 112 at the inputs to flip-flops 10, 11 and 12 of FIG. 1b and is shifted therein upon the next succeeding pulse on line 17.

From the above example, it can be seen that a positive residual count in DOWN counter 53 of FIG. 1c causes the Z axis digits 0 0 0 in UP/DOWN counter of FIG. 1d to be updated into 0 0 1 and than applied to flip-flops 10, 11 and 12 of FIG. 1b. The updated number 0 0 1 eventually will be set into DOWN counter 53; if there is no change in the number of pulses in the next group supplied by data sensor 49 of FIG. 1c, and DOWN counter 53 will count down from 0 0 1 precisely to ZERO. The updated Z axis number at the inputs to flip-flops 10, 11 and 12 is shifted into flip-flops 10, 11 and 12 and through flip-flops 63, 64, and 65 and into flip-flops 69, 70 and 71 in response to three successive pulses applied to lead 17. All three pulses occur between successive pulse groups from sensors 1, 48 and 49.

When the updated Z axis number is shifted into UP/DOWN counter 5, the X and Y axis data is shifted into UP/DOWN counter 61 and into UP/DOWN counter 62, respectively. Then, the Y axis data is updated by applying a signal to Y axis selection line 59 of FIG. 1a and the updated data is shifted into UP/DOWN counter 5 while the Z and X data is shifted into UP/DOWN counters 61 and 62, respectively. Finally, the X axis data is updated by applying a signal to X axis selection line 58 of FIG. 1a and the updated data is shifted into UP/DOWN counter 5 while the y and Z data is shifted into UP/DOWN counters 61 and 62 to complete a full cycle of updating operation. The updated X, Y and Z axis data is inserted simultaneously into DOWN counters 4, 51 and 53 on the application of a signal to lead 16 only after each completion of the updating cycle.

The number of pulses in a given pulse group from sensor 1 may completely fill the numerical capacity of UP counter 2 and UP/DOWN counter 5. A positive increment beyond that number clears UP counter 2 and UP/DOWN counter 5 and produces a positive overflow for application to additional UP/DOWN counters which accumulate the overflows and thus resolve the ambiguity in the data provided by sensor 1. A given overflow, of course, also could be negative as in the case of the above-discussed example where the Z axis number 0 0 0 was updated (negatively) into the number 0 0 1. Negative-going overflows are represented by ZERO signals on leads 113, 114 and 115 of FIG. 1d. Said signals are applied to the input of overflow UP/DOWN counters 116, 117 and 118 of FIG. 2. Counter 116 comprises flip-flops 119, 120, 121 and 122, the first of which effects a divide-by-two function and the last three of which effect a divide-by-five function whereby all four flip-flops constitute a decade counter. Counters 117 and 118 are similarly arranged for accumulating the overflows of the Y and Z coordinate data.

Figure 2:
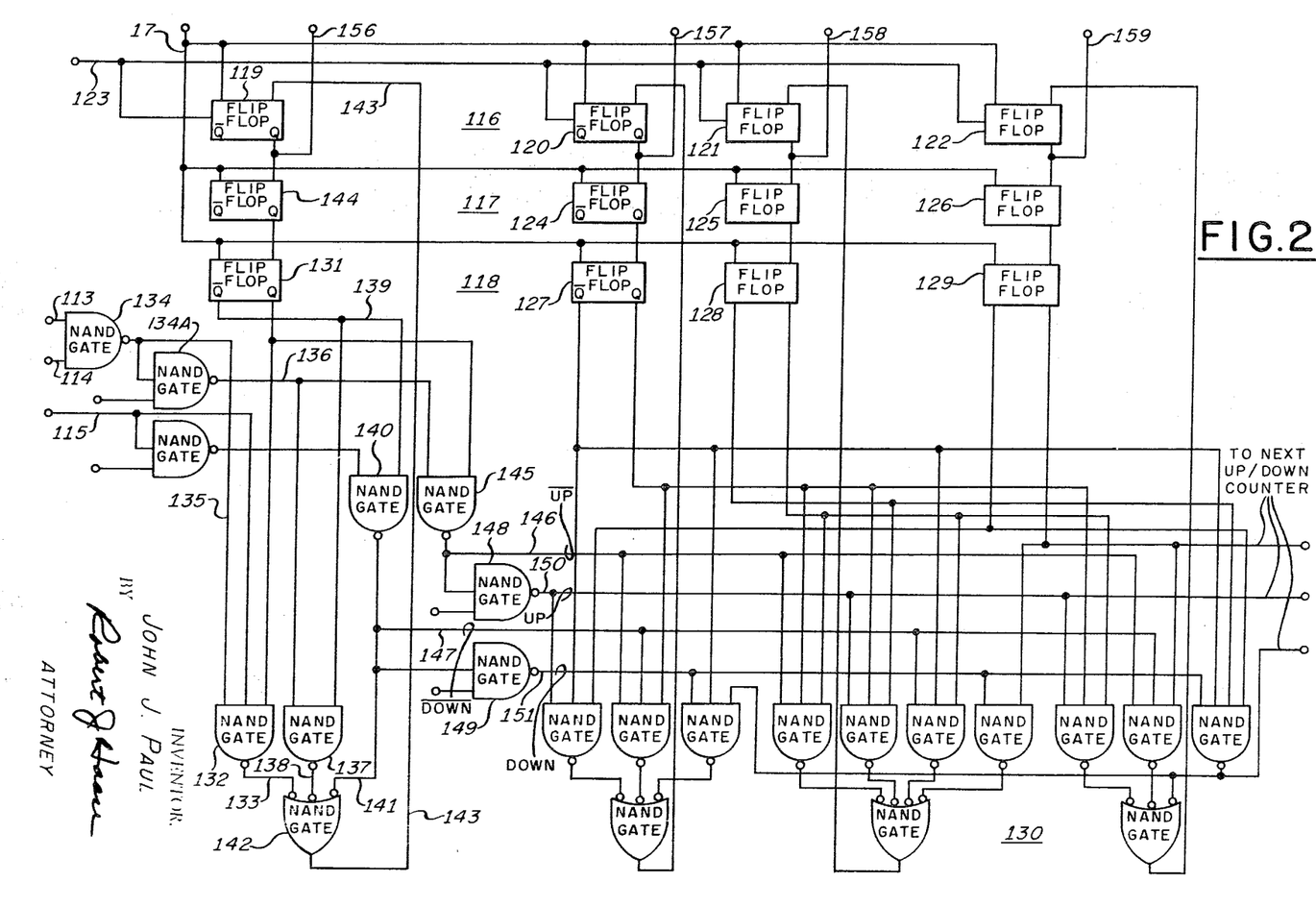
FIG. 2 is a simplified block diagram of a second time-shared UP/DOWN counter cascaded to the UP/DOWN counter of FIGS. 1b and 1d.

All overflow counter flip-flops are reset by a signal on lead 123, when the machine tool table is moved to its X, Y and Z reference positions. The stored data is cyclically shifted through the UP/DOWN counters 116, 117 and 118 in a manner similar to that described in connection with UP/DOWN counters 5, 61 and 62. Thus, each of the X, Y and Z data is reset to ZERO when the machine tool table is in its reference position as the X, Y and Z data is shifted through UP/DOWN counter 116. Except for the provision for initial resetting, the nine flip-flops 120, 121, 122, 124, 125, 126, 127, 128 and 129 of UP/DOWN counters 116, 117 and 118 and the logic circuitry 130 is identical in structure and operation to the corresponding nine flip-flops and logic circuitry associated with UP/DOWN counters 5, 61 and 62 of FIGS. 1b and 1d. Logic circuitry 130 does not include any gates corresponding to NAND gates 76, 77, 78 and 79 of FIG. 1d inasmuch as the UP/DOWN counters of FIG. 2 are reset initially. As previously mentioned, NAND gates 76, 77, 78 and 79 of FIG. 1d are required to preclude false counts from entering the storage flip-flops because they are not reset at any time.

The individual digits of the total X coordinate number are available on output lines 152 through 159 of FIGS. 1a, 1b and 2 during the time that the X coordinate data is in UP/DOWN counters 5 of FIG. 1b and 116 of FIG. 2. The Y coordinate data is available on output lines 160 and 153—159 during the time that the Y data is in UP/DOWN counters 5 and 116. The Z coordinate data is available on output lines 162 of FIG. 1c and 153—159 during the time that the Z coordinate data is in UP/DOWN counters 5 and 116.

To illustrate the operation of the UP/DOWN counters of FIG. 2, assume that the Z axis overflows have caused flip-flops 131, 127, 128 and 129 to store 1 1 0 0, respectively. It will be recalled that in the example discussed in connection with FIGS. 1b and 1d, the Z axis number 0 0 0 was updated into the number 0 0 1 generating a negative carry. The negative carry causes the assumed ONE stored in flip-flop 131 to be updated to the value ZERO in the following manner. The ZERO on lead 115 is inverted by NAND gate 132 into a ONE on lead 133. The ZEROS on leads 113 and 114 at the input to gate 134 produce a ONE on lead 135 which is inverted by NAND gate 134A to a ZERO on lead 136 at the input to NAND gate 137. Gate 137, in turn, produces a ONE on lead 138. The ZERO on lead 139 at the $\overline{\text{Q}}$ output of flip-flop 131 is inverted in NAND gate 140 into a ONE on lead 141. Thus, all three inputs to NAND gate 142 are ONES and a ZERO is produced on output lead 143. The ZERO on lead 143 is shifted into flip-flop 119 on the next occurring pulse on lead 17 and through flip-flop 144 and into flip-flop 131 on the next two succeeding pulses applied to lead 17. Thus, the ONE stored in flip-flop 131 is updated to the value ZERO in response to a negative Z axis overflow from FIG. 1d.

Possible carries resulting from the updating of the data stored in flip-flop 131 are generated when necessary by NAND gates 140 and 145. In the assumed case under discussion, no carry is generated. The ZERO on lead 136 is inverted by gate 145 to a ONE on lead 146. The ZERO on lead 139 is inverted by gate 140 into a ONE on lead 141. Gates 148 and 149 provide ZEROS on leads 150 and 151 whereby 1, 0, 1, and 0 appear on leads 146 (UP), 150 (UP), 147 ($\overline{DOWN}$) and 151 (DOWN), respectively. The command signals on leads 146, 150, 147 and 151 control the logic circuitry 130 in the same manner described in the case of the command signals on leads 30, 27, 31 and 25 and the associated logic circuitry of FIG. 1d.

It can be seen from the preceding specification that a single coordinate axis of the present invention comprises an UP counter, a DOWN counter, a first UP/DOWN counter and a second UP/DOWN counter. The numerical capacity of the UP counter and the first UP/DOWN counter together are no greater than the maximum number of pulses occurring in the unambiguous range of the sensor and applied to the UP counter. The UP counter is reset to ZERO between each input pulse group so that its count always reflects the true pulse count whereas the count in the first UP/DOWN counter is made equal to the true count by a process of comparison and updating. The comparison between the number stored in the first UP/DOWN counter and the number of pulses in the incoming pulse group is effected with the aid of the DOWN counter whose residual count indicates the sense and magnitude of the updating (if necessary) to bring the stored count in the first UP/DOWN counter into equality with the latest count. The ambiguity of the data sensor is resolved with the aid of the second UP/DOWN counter which accumulates the overflows generated by the first UP/DOWN counter both in the negative and positive senses.

Inasmuch as the overflows are accumulated in a "dead reckoning" type of operation, it is necessary to return the machine tool table to its reference positions in all three axes and to reset the second UP/DOWN counters to zero in the event of a power failure or any other eventuality that introduces an erroneous count into the second UP/DOWN counter. Economy of apparatus is achieved by fully exploiting time-sharing techniques in both the first and the second UP/DOWN counters.

While the invention has been described in its preferred embodiments, it is to be understood that the words which have been used are words of description rather than limitation and that changes within the purview of the appended claims may be made without departing from the true scope and spirit of the invention in its broader aspects.

I claim:

1. Apparatus for counting the number of pulses in recurring groups of pulses, which are spaced apart in time, comprising
a backward counter that can count a plurality of pulses and store a value corresponding to the difference between a preset value and said plurality of pulses,
an input for said backward counter to which all of the pulses of said groups of pulses are applied,
a bidirectional counter that can store a number of individually-different counts,
the pulses in each group of pulses being applied to said input for said backward counter to cause said backward counter to count backward from a preset value,
first means coupled between said backward counter and said bidirectional counter that can be activated to respond to the value of the count in said bidirectional counter to preset the count in said backward counter to the value of the count in said bidirectional counter,
said first means being activated in the period between said groups of pulses and thereby presetting the count in said backward counter to the value of the count in said bidirectional counter during a time when said backward counter is not receiving any of said groups of pulses, and
second means coupled between said backward counter and said bidirectional counter that can be activated to respond to the residual count in said backward counter at the end of each group of said pulses for updating the count in said bidirectional counter,
said second means sensing said residual count in said backward counter while said backward counter is at rest and being activated to apply signals to said bidirectional counter that correspond to said residual count in said backward counter and that update said count in said bidirectional counter.

2. Apparatus for counting the number of pulses in recurring groups of pulses, which are spaced apart in time, comprising
a forward counter that can count a plurality of pulses and produce an overflow signal when the maximum count in said forward counter is exceeded,
an input for said forward counter to which all of the pulses of said groups of pulses are applied,
a backward counter that can count a plurality of overflow signals from said forward counter and store a value corresponding to the difference between a preset value and said plurality of overflow signals,
a first bidirectional counter that can store a number of individually-different counts,
the pulses in each group of pulses being applied to said input for said forward counter to cause said forward counter to produce an overflow signal when the maximum count in said forward counter is exceeded,
each said overflow signal produced by said forward counter being applied to said backward counter to cause said backward counter to count backward from a preset value,
first means coupled between said backward counter and said first bidirectional counter that can be activated to respond to the value of the count in said first bidirectional counter to preset the count in said backward counter to the value of the count in said first bidirectional counter,
said first means being activated in the period between groups of said pulses and thereby presetting the count in said backward counter to the value of the count in said bidirectional counter during a time when said backward counter is not receiving any of said overflow signals from said forward counter, and
second means coupled between said backward counter and said bidirectional counter that can be activated to respond to the residual count in said backward counter at the end of each group of said pulses for updating the count in said first bidirectional counter.

3. Apparatus as defined in claim 2 wherein logic circuitry couples the input of a second bidirectional counter to the output of said first bidirectional counter, and wherein said logic circuitry applies overflows from said first bidirectional counter to said input of said second bidirectional counter.

4. Apparatus for counting the number of pulses in recurring groups of pulses, which are spaced apart in time, comprising
a backward counter that can count a plurality of pluses and store a value corresponding to the difference between a preset value and said plurality of pulses,
an input for said backward counter to which all of the pulses of said groups of pulses are applied,
a bidirectional counter that can store a number of individually-different counts,
the pulses in each group of pulses being applied to said input for said backward counter to cause said backward counter to count backward from a preset value,
first means coupled between said backward counter and said bidirectional counter that can be activated to respond to the value of the count in said bidirectional counter to preset the count in said backward counter to the value of the count in said bidirectional counter, said first means being activated in the period between groups of said pulses and thereby presetting the count in said backward counter to the value of the count in said bidirectional counter during a time when said backward counter is not receiving any of said groups of pulses, second means coupled to the output of said backward counter that senses the residual count in said backward counter to develop an updating signal to update the count in said bidirectional counter in accordance with said residual count in said backward counter at the end of each group of said pulses, and third means coupled to said bidirectional counter and responsive to said updating signal developed by said second means for updating the count in said bidirectional counter, said second means sensing said residual count in said backward counter while said backward counter is at rest and being activated to apply signals to said bidirectional counter that correspond to said residual count in said backward counter and that update said count in said bidirectional counter.

5. Apparatus for counting the number of pulses in recurring first groups of pulses, which are spaced-apart in time, comprising a first forward counter that can count a plurality of pulses and produce an overflow signal when the maximum count in said first forward counter is exceeded, an input for said first forward counter to which all of the pulses of said first groups of pulses are applied, a first backward counter that can count a plurality of overflow signals and store a value corresponding to the difference between a preset value and said plurality of overflow signals, a first bidirectional counter that can store a number of individually-different counts, the pulses in each of said first groups of pulses being applied to said input for said first forward counter to produce a first overflow signal when the maximum count of said first forward counter is exceeded, each said first overflow signal being applied to the input of said first backward counter to cause said first backward counter to count backward from a preset value, first means coupled between said first backward counter and said first bidirectional counter that can be activated to respond to the value of the count in said first bidirectional counter to preset the count in said first backward counter to the value of the count in said first bidirectional counter, said first means being activated in the period between groups of said first pulses and thereby presetting the count in said backward counter to the value of the count in said bidirectional counter during a time when said backward counter is no receiving said groups of said first pulses, second means coupled to the output of said first backward counter that senses the residual count in said backward counter to develop a first updating signal for said first bidirectional counter in accordance with said residual count in said first backward counter at the end of each group of said first pulses, and third means coupled to said first bidirectional counter and responsive to said first updating signal developed by said second means for updating the count in said first bidirectional counter.

6. Apparatus as defined in claim 5 wherein logic circuitry couples the input of a second bidirectional counter to the output of said first bidirectional counter, and wherein said logic circuitry applies overflows from said first bidirectional counter to said input of said second bidirectional counter.

7. Apparatus for counting the number of pulses in recurring first groups of pulses and in recurring second groups of pulses comprising a first forward counter that can count a plurality of pulses and produce an overflow signal when the maximum count in said first forward counter is exceeded, a first backward counter that can count a plurality of overflow signals and store a value corresponding to the difference between a preset value and said plurality of overflow signals, a first bidirectional counter that can store a number of individually-different counts, the pulses of said first groups of pulses being applied to said first forward counter to produce a first overflow signal when the maximum count of said first forward counter is exceeded, each said first overflow signal being applied to the input of said first backward counter to cause said first backward counter to count backward from a preset value, first means coupled between said first backward counter and said first bidirectional counter to preset the count in said first backward counter to the value of the count in said first bidirectional counter, said first means being activated in the period between groups of said first pulses, second means coupled to said first backward counter for producing a first updating signal in accordance with the residual count in said first backward counter at the end of each group of said first pulses, third means coupled to said first bidirectional counter and responsive to said first updating signal produced by said second means for updating the count in said first bidirectional counter, a second forward counter that can count a plurality of pulses and produce a second overflow signal when the maximum count in said second forward counter is exceeded, a second backward counter that can count a plurality of second overflow signals and store a value corresponding to the difference between a preset value and said plurality of second overflow signals, a second bidirectional counter that can store a number of individually-different counts, said recurring second groups of pulses being applied to said second forward counter to produce a second overflow signal when the maximum count in said second forward counter is exceeded, said first and second groups of pulses occurring substantially simultaneously, each said second overflow signal being applied to said second backward counter to cause said second backward counter to count backward from a preset value, fourth means coupled between said second backward counter and said second bidirectional counter to preset the count in said second backward counter to the value of the count in said second bidirectional counter, said fourth means being activated in the period between said second groups of pulses, and fifth means coupled to said second backward counter for producing a second updating signal in accordance with the residual count in said second backward counter at the end of each group of said second groups of pulses, said third means successively coupling said first updating signal produced by said second means and said second updating signal produced by said fifth means to said bidirectional counters to update the counts in said bidirectional counters, whereby the count in said first bidirectional counter is updated to correspond to said first updating signal produced by said second means and the count in said second bidirectional counter is updated to correspond to said second updating signal provided by said fifth means.

8. Apparatus as defined in claim 7 and further including a third bidirectional counter coupled to the output of said first bidirectional counter, and a fourth bidirectional counter coupled to the output of said second bidirectional counter.